United States Patent
Richton et al.

(10) Patent No.: US 6,570,529 B2
(45) Date of Patent: May 27, 2003

(54) AUTONOMOUS CALIBRATION OF A WIRELESS-GLOBAL POSITIONING SYSTEM

(75) Inventors: Robert E. Richton, Whippany, NJ (US); Kenneth C. Budka, Marlboro, NJ (US); Daniel R. Jeske, Eatontown, NJ (US); Doru Calin, Bazoches sur Guyonne (FR)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/863,438

(22) Filed: May 24, 2001

(65) Prior Publication Data

US 2002/0175855 A1 Nov. 28, 2002

(51) Int. Cl.[7] ............................. H04B 7/185; G01S 5/02
(52) U.S. Cl. ................................................. 342/357.02
(58) Field of Search ....................... 342/357.02, 357.06, 342/357.01, 357.13, 174

(56) References Cited

U.S. PATENT DOCUMENTS

| | | | |
|---|---|---|---|
| 4,463,357 A | * | 7/1984 | MacDoran ................... 343/460 |
| 4,965,586 A | * | 10/1990 | O'Neill et al. ............... 342/357 |
| 5,467,282 A | * | 11/1995 | Dennis ........................ 364/449 |
| 5,948,043 A | | 9/1999 | Mathis |
| 5,982,324 A | | 11/1999 | Watters et al. |
| 6,002,936 A | | 12/1999 | Roel-Ng et al. |
| 6,026,304 A | | 2/2000 | Hilsenrath et al. |
| 6,353,406 B1 | * | 3/2002 | Lanzl et al. ................. 342/118 |
| 6,369,754 B1 | * | 4/2002 | Levanon ................. 342/357.16 |
| 6,373,432 B1 | * | 4/2002 | Rabinowitz et al. ... 342/357.16 |
| 2002/0016172 A1 | * | 2/2002 | Kangras et al. ............. 455/456 |
| 2002/0037705 A1 | * | 3/2002 | Moerder et al. ............ 455/115 |

FOREIGN PATENT DOCUMENTS

| | | |
|---|---|---|
| EP | 0 631 453 A2 | 12/1994 |
| WO | WO 98/10538 | 3/1998 |
| WO | WO 01/28272 | 4/2001 |

* cited by examiner

*Primary Examiner*—Dao Phan
(74) *Attorney, Agent, or Firm*—Harness, Dickey & Pierce, PLC

(57) ABSTRACT

A wireless-global positioning system determines the location of a wireless mobile communication device from reliable position measurements and wireless network downlink measurements. The wireless network downlink measurements obtained are then used in conjunction with a database for pattern matching or contour matching. The difficulty of building and maintaining that database is alleviated by using those network downlink measurements associated with the reliable position measurements to populate the database, such as GPS measurements or those obtained through enhanced based positioning technique (EOTD). The increased database accuracy subsequently improves the quality of position location measurements from the wireless network.

85 Claims, 7 Drawing Sheets

AUTONOMOUS CALIBRATION OF A WIRELESS-GLOBAL POSITIONING SYSTEM

FIELD OF THE INVENTION

The present invention relates generally to determining the location of wireless mobile communication devices. More particularly, it relates to techniques for wireless location in an integrated system.

DESCRIPTION OF THE RELATED ART

One way to determine position or location of an object is through the use of Global Positioning Systems (GPS). Global positioning systems, which are satellite based, provide accurate, three dimensional position information to worldwide users. FIG. 1a depicts a global positioning system (GPS) 10. The GPS 10 comprises a plurality of satellites 12-j and at least one GPS receiver 14, where j=1, 2, ..., n. Each satellite 12-j orbits the earth at a known speed $v_j$ and is separated by a known distance from the other satellites 12-j. Each satellite 12-j transmits a global position signal 11-j which includes a carrier signal with a known frequency f modulated with a unique pseudo-random noise (PN-j) code and navigational data (ND-j) associated with the particular satellite 12-j. The PN-j code includes a unique sequence of PN chips and navigation data ND-j which includes a satellite identifier, timing information and orbital data, such as elevation angle $\alpha_j$ and azimuth angle $\phi_j$. FIG. 1b depicts a typical 20 ms frame of the GPS signal 11-j which comprises twenty full sequences of a PN-j code in addition to a sequence of navigation data ND-j.

GPS receiver 14 comprises an antenna 15 for receiving GPS signals 1-j, a plurality of correlators 16-k for detecting GPS signals 11-j and a processor 17 having software for determining a position using the navigation data ND-j, where k=1, 2, ..., m. GPS receiver 14 detects GPS signals 11-j via PN-j codes. Detecting GPS signals 11-j involves a correlation process wherein correlators 16-k are used to search for PN-j codes in a carrier frequency dimension and a code phase dimension. Such a correlation process is implemented as a real-time multiplication of phase shifted replicated PN-j codes modulated onto a replicated carrier signal with the received GPS signals 11-j, followed by an integration and dump process.

In the carrier frequency dimension, GPS receiver 14 replicates carrier signals to match the frequencies of the GPS signals 11-j as they arrive at GPS receiver 14. However, due to the Doppler effect, the frequency f at which GPS signals 11-j are transmitted changes an unknown amount $\Delta f_j$ before the signal 11-j arrives at the GPS receiver 14. Thus, each GPS signal 11-j will have a frequency $f+\Delta f_j$ when it arrives at the GPS receiver 14. To compensate for the Doppler effect, GPS receiver 14 replicates the carrier signals across a frequency spectrum $f_{spec}$ ranging from $f+\Delta f_{min}$ to $f+\Delta f_{max}$ until the frequency of the replicated carrier signal matches the frequency of the received GPS signal 11-j, wherein $\Delta f_{min}$ and $\Delta f_{max}$ are a minimum and maximum change in the frequency the GPS signals 11-j will undergo due to the Doppler effect as they travel from satellites 12-j to GPS receiver 14, i.e., $\Delta f_{min} \leq \Delta f_j \leq \Delta f_{max}$.

In the code phase dimension, GPS receiver 14 replicates the unique PN-j codes associated with each satellite 12-j. The phases of the replicated PN-j codes are shifted across code phase spectrums $R_j(spec)$ until the replicated carrier signals modulated with the replicated PN-j codes correlate, if at all, with the GPS signals 11-j being received by the GPS receiver 14, where each code phase spectrum $R_j(spec)$ includes every possible phase shift for the associated PN-j code. When the GPS signals 11-j are detected by the correlators 16-k, GPS receiver 14 extracts the navigation data ND-j from the detected GPS signals 11-j and uses the navigation data ND-j to determine a location for the GPS receiver 14.

A GPS enables a ground based receiver to determine its position by measuring the time difference required for GPS signals initiated from two or more satellites to be received by the GPS receiver 14. The pseudorange is defined as this time difference times the speed of light. The pseudorange is not the real range because it contains errors caused by the receiver clock offset. To determine a two-dimensional position (latitude and longitude) usually entails receiving signals from at least three satellites. To determine a three-dimensional position (latitude, longitude, and altitude) usually entails requires receiving pseudoranges from four or more satellites. This precondition, however, may not always be satisfied, especially when the direct satellite signals are obstructed, such as when a wireless terminal is inside a building.

GPS receivers, such as GPS receiver 14, are now being incorporated into wireless mobile communication devices (including mobile telephones, PDAs, pagers, portable computers, etc.). However, these devices do not always have a clear view of the sky. In this situation, the signal-to-noise ratios of GPS signals 11-j received by GPS receiver 14 are typically much lower than when GPS receiver 14 does have a clear view of the sky, thus making it more difficult for GPS receiver 14 to detect the GPS signals 11-j.

Integrated wireless-global positioning (WGP) systems were developed to facilitate the detection of GPS signals by GPS receivers in wireless mobile communication devices. The WGP system facilitates detection of GPS signals by reducing the number of integrations to be performed by correlators searching for GPS signals. The number of integrations is reduced by narrowing the frequency range and code phase ranges to be searched. Specifically, the WGP system limits the search for GPS signals to a specific frequency or frequencies and to a range of code phases less than the code phase spectrum $R_j(spec)$. However, problems of obstructed signals still exist. Further, an even greater problem involves the fact that many wireless mobile communication devices do not include any type of GPS receiver. These type of "legacy" devices, therefore, need to be located by some other measure.

Another known way of determining the position of a wireless mobile communication device is to utilize information obtained from a wireless network. One such method of geolocation uses signal strength measurements. In the IS136 and IS54 standards, signal strengths are extensively used for so-called MAHO (mobile-assisted handoff) process. The MAHO measurement contains signal strength information, which reflects the distance between the wireless terminal and a base station (BS). MAHO measurement lists are routinely delivered by wireless mobile communication devices for handoff purposes and form the basis of a low-accuracy geolocation system based on either, or a combination, of two techniques: "triangulation" and "contour matching".

In the first technique, "triangulation," the signal strength from multiple MAHO channels is associated with a location of a wireless mobile communication device. This then produces a geometric triangulation mathematical problem that can be solved to determine the location of the wireless mobile communication device ("wireless mobile"). FIG. 2 illustrates a known method for determining a location from which a mobile caller originates a call on a wireless mobile 102. Specifically, a signal originating from at least one base station, such as base station 104, reaches the wireless mobile 102 with a particular signal strength at a particular time. Similarly, signals from base stations 106 and 108 send similar signals, which arrive at wireless mobile 102 at the same time but with varying signal strengths. In aIS136-based network, many such signals arrive at a given instant and their strengths are recorded for handoff purposes. Methods for using these data to determine such a location of the wireless mobile 102 are well-known and will not being further described for the sake of brevity.

In the second technique, termed "contour matching", the wireless system receives MAHO measurements and compares these relative signal strength measurements to a specifically-developed database of stored positions (grid locations) and relative signal strength measurements within the cell serving the call. The wireless system can then determine the location of the wireless mobile communication device by matching its signal strength measurements to the corresponding signal strength measurements of one of these grid locations in the database. An improvement on the grid system was to establish contours between grid points using interpolation and in some cases prediction from simulations or propagation models. Once the database is established, received signals can be matched to the contours, thus the name "contour matching."

An alternative to the MAHO technique discussed is the so-called Enhanced Cell Global Identity (ECGI) method. CGI is a standardized technique for geolocation in the Global System for Mobile communications (GSM), and involves enhancing CGI by database matching techniques described previously. For GSM, however, what we have called MAHO is replaced by Timing Advance (TA). TA measurements, like MAHO measurements, are made at the mobile terminal (wireless mobile communication device) and can determine, albeit with low precision, the location of a wireless mobile communication device. TA measurements differ fundamentally from MAHO measurements in that TA is time-based and MAHO is strength-based, but both can be used as indicators of distance, and thus be applied to location finding.

To summarize concepts begun above, a database technique can be used to locate wireless mobile communication devices. The database technique can use direct (grid based) data matching or a contour matching technique. The underlying data populating the database always contains geographic coordinates (e.g., latitude/longitude data), and also may contain either signal strength data (such as MAHO data), TA data, both or other data types. Other data types may be used as well.

However, a major problem with using wireless network based signals such as signal strength (MAHO) data, TA data, etc., to determine the location of a wireless mobile communication device is that measurement errors are nearly always much larger than the satellite based navigational system measurement errors. Further, there are many problems involved with creating the database. Signals may be blocked, drive testing to each location in each cell may be tedious and impractical, small samples from a cell are typically used, etc. Additionally, when network operational parameters change or new basestations are brought on line, the database must be recalibrated.

Integrated wireless-global positioning (WGP) systems rely on both the satellite navigation system and the wireless communication system to determine the location of a wireless terminal. An integrated wireless-global positioning system combines the data from both the wireless network and the satellite navigation system to obtain an integrated position solution. By combining information from both the global positioning system and the wireless network, it is possible to increase the positioning accuracy and, at the same time, overcome the requirement of having at least three measurements from a single source type. However, such systems do not exist in all currently used wireless mobile communication devices, and thus other methods must be used in connection with existing legacy wireless mobile communication devices.

FIG. 3 depicts an integrated wireless global positioning system 20 comprising a WGP server 22, a plurality of base stations 23 and at least one WGP client 24. WGP server 22 includes a GPS receiver 26 having an antenna 27 installed in a known stationary location with a clear view of the sky. WGP server 22 is operable to communicate with base stations 23 either via a wired or wireless interface. Each base station 23 is at a known location and provides communication services to WGP clients located within a geographical area or cell 25 associated with the base station 23, wherein each cell 25 is a known size and may be divided into a plurality of sectors. WGP client 24 includes a GPS receiver 28 and perhaps a wireless terminal such as a wireless telephone 29, and is typically in motion and/or at an unknown location with or without a clear view of the sky.

FIG. 4 is a flowchart 300 illustrating the operation of WGP system 20. In step 310, WGP server 22 detects a plurality of satellites 12-j via their GPS signals 11-j using its GPS receiver 26. WGP server 22 acquires the following information from each detected satellite 12-j: the identity of satellite 12-j and frequency $f_j$, code phase, elevation angle $\alpha_j$ and azimuth angle $\phi_j$ associated with the detected satellite 12-j, wherein the elevation angle $\alpha_j$ is defined as the angle between the line of sight from WGP server 22 or client 24 to a satellite 12-j and a projection of the line of sight on the horizontal plane, and the azimuth angle $\phi_j$ is defined as the angle between the projection of the line of sight on the horizontal plane and a projection of the north direction on the horizontal plane. FIG. 5 depicts an elevation angle $\alpha_j$ and an azimuth angle $\phi_j$ corresponding to a satellite 12-j and a WGP server 22 or WGP client 24.

In step 315, WGP server 22 receives sector information from base station 23 currently in communication with or serving WGP client 24, wherein the sector information indicates the sector WGP client 24 is currently located. In step 320, WGP server 22 makes an initial estimate of WGP client's position based on the known location of the serving base station, the cell size associated with the serving base station, and the sector in which WGP client 24 is currently located. In one embodiment, WGP server 22 initially estimates that WGP client 24 is located at a reference point within the sector, e.g., point at approximate center of sector. In another embodiment, WGP server 22 initially estimates WGP client 24's position using known forward link triangulation techniques.

In step 330, for each detected satellite 12-j, WGP server 22 uses the information acquired from the detected GPS signals 11-j to predict a frequency $f_j(r)$ at the reference point and a code phase search range $R_j(sect)$ which includes all possible code phases for GPS signal 11-j arriving anywhere within the sector where WGP client 24 is currently located. In step 340, WGP server 22 transmits a search message to the serving base station 23, where the search message includes, for each detected satellite 12-j, information regarding the associated PN-j code, predicted frequency $f_j(r)$ and code phase search range $R_j$(sect).

In step 350, serving base station 23 transmits the search message to WGP client 24 which, in step 360, begins a parallel search for the satellites 12-j indicated in the search message. Specifically, WGP client 24 uses its correlators to simultaneously search for each of the GPS signals 11-j at the predicted frequency $f_j(r)$ within the limitations of the code phase search range $R_j$(sect) indicated in the search message.

The performance of an integrated wireless-global positioning system depends directly on the quality and accuracy of the information received from the satellite and the wireless network, namely, the pseudoranges and the signal strength (MAHO), TA data, etc. Unfortunately, these measurements are normally noisy and especially for the technique referred to above as "contour matching," it is difficult to initially build and subsequently maintain a proper database. Accurately determining the required database normally requires extensive "drive testing", where calibrated equipment is driven around a wireless coverage area making the necessary measurements in a calibrated fashion to help populate the database. Drive testing may have to be repeated periodically. This labor-intensive process can render the technique too costly.

Accordingly, a need exists for determining the position of wireless mobile communication devices which do not have unobstructed reception of the satellite signals, are not equipped with GPS capabilities. This latter category, wireless mobile communication devices without GPS capability, is crucial because during a transition period many wireless mobiles will lack such capability. During the transition period, which may last almost indefinitely, legacy mobiles will still need to be located for emergency services, such as E911 calls, for example.

SUMMARY OF THE INVENTION

A system and method of the present application involves calibration or population of a position locating system, with reliable position information (from GPS signals, position signals derived from enhanced based position techniques, etc.). Thereafter, both downlink network information and reliable position information are associated together. Thus, network downlink information (MAHO data for signal strength/TA data, etc.) is associated with accurate position information to accurately populate a database, and can thereafter be used to determine position based on triangulation, contour matching, etc. Such an accurate location system can thereafter be used to locate a wireless mobile communication device, such as in E911 situations, for example.

DETAILED DESCRIPTION OF THE PREFERRED EMBODIMENT

Figure 1A:
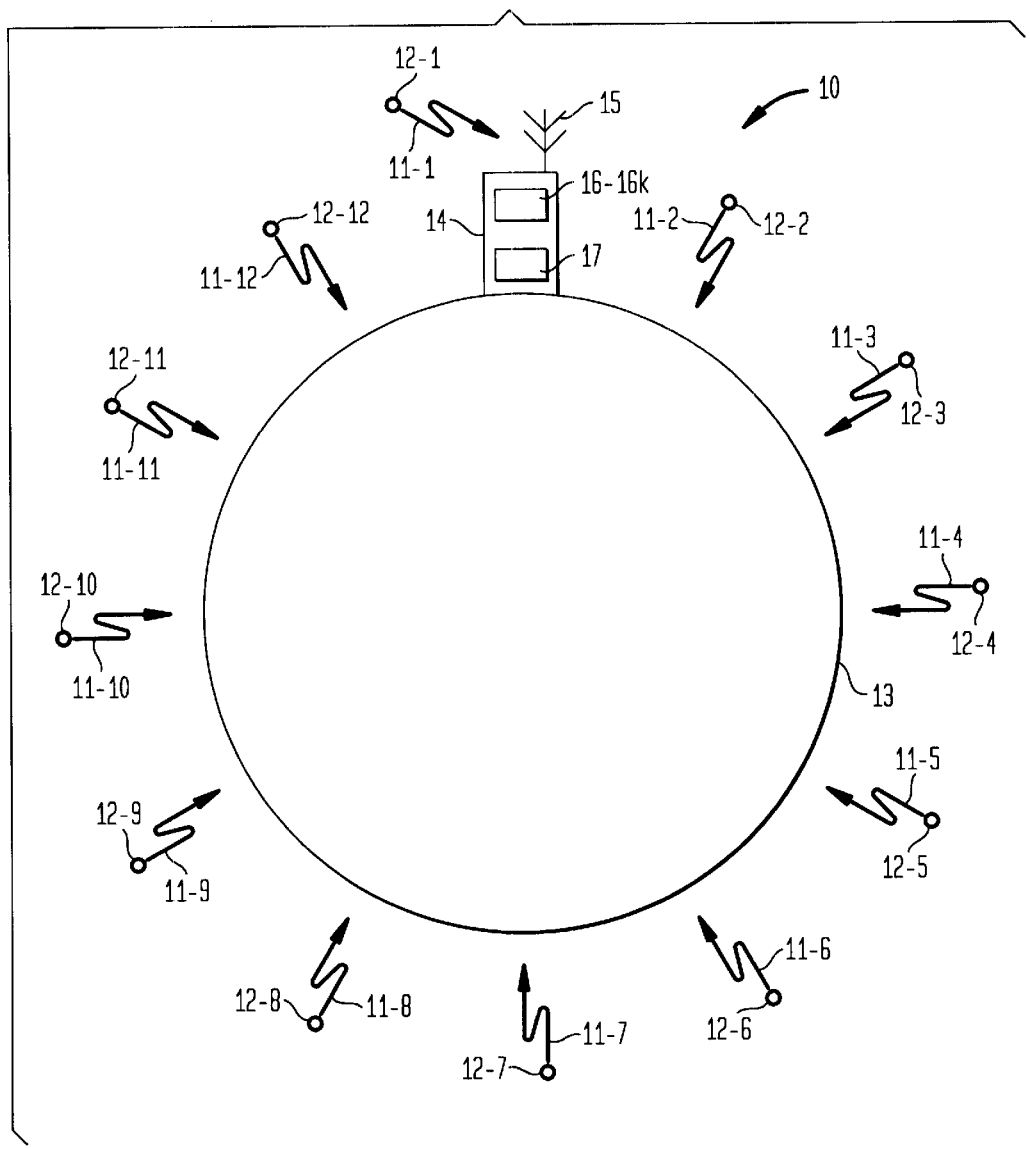
FIG. 1a depicts a prior art satellite-based navigational system referred to as global positioning system (GPS)
Figure 1B:
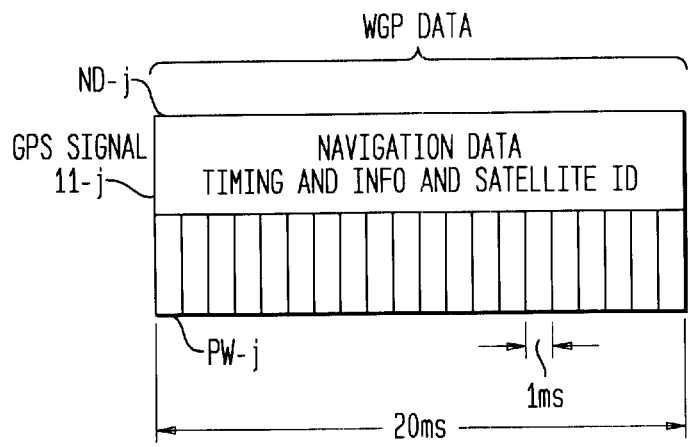
FIG. 1b depicts a typical 20 ms frame of a GPS signal.
Figure 2:
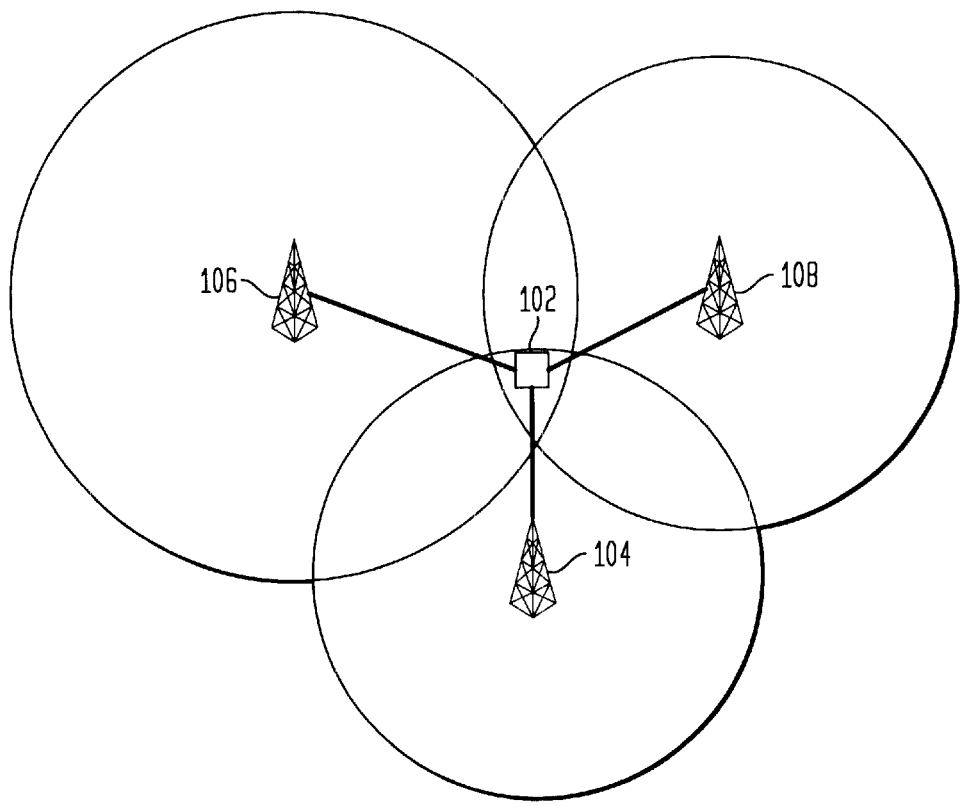
FIG. 2 depicts a system for estimating a calling area based on TOA.
Figure 3:
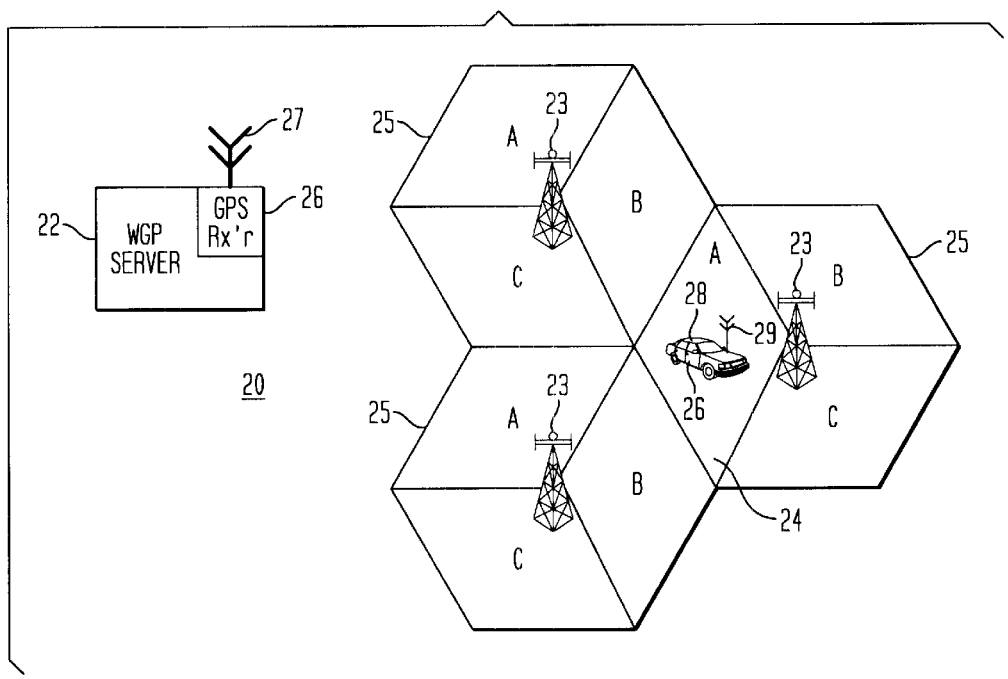
FIG. 3 depicts an integrated wireless-global positioning system.
Figure 4:
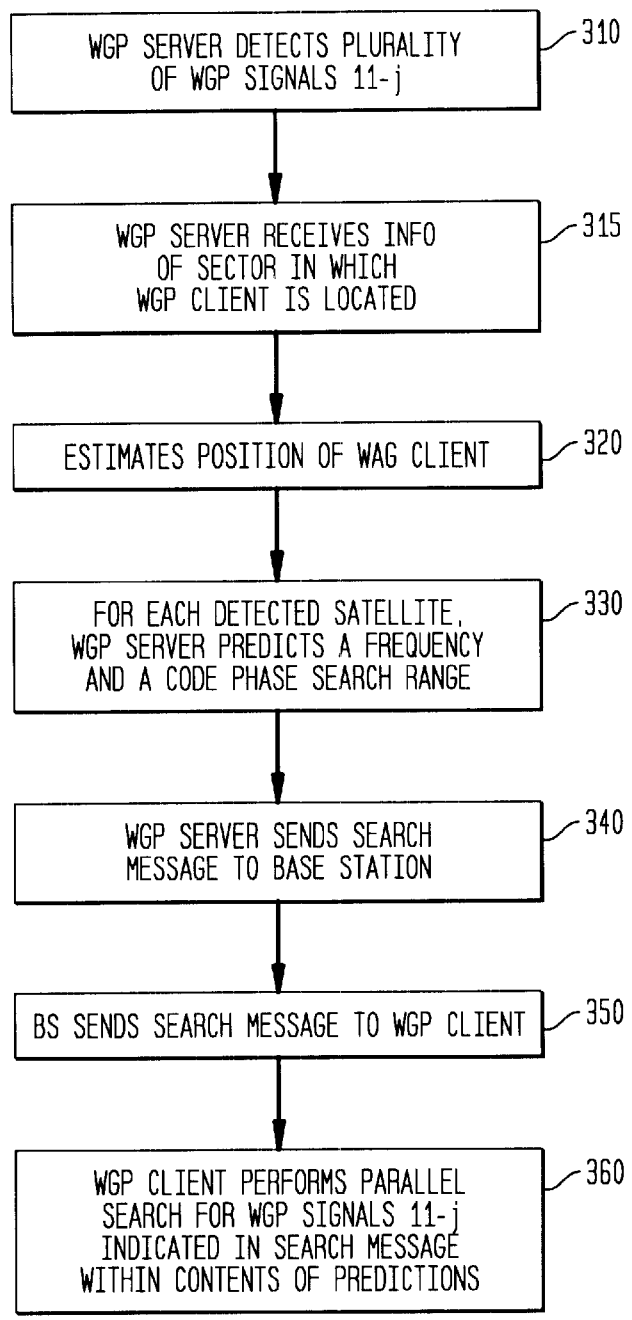
FIG. 4 depicts a flowchart illustrating the operation of the integrated wireless-global positioning system of FIG. 3.
Figure 5:
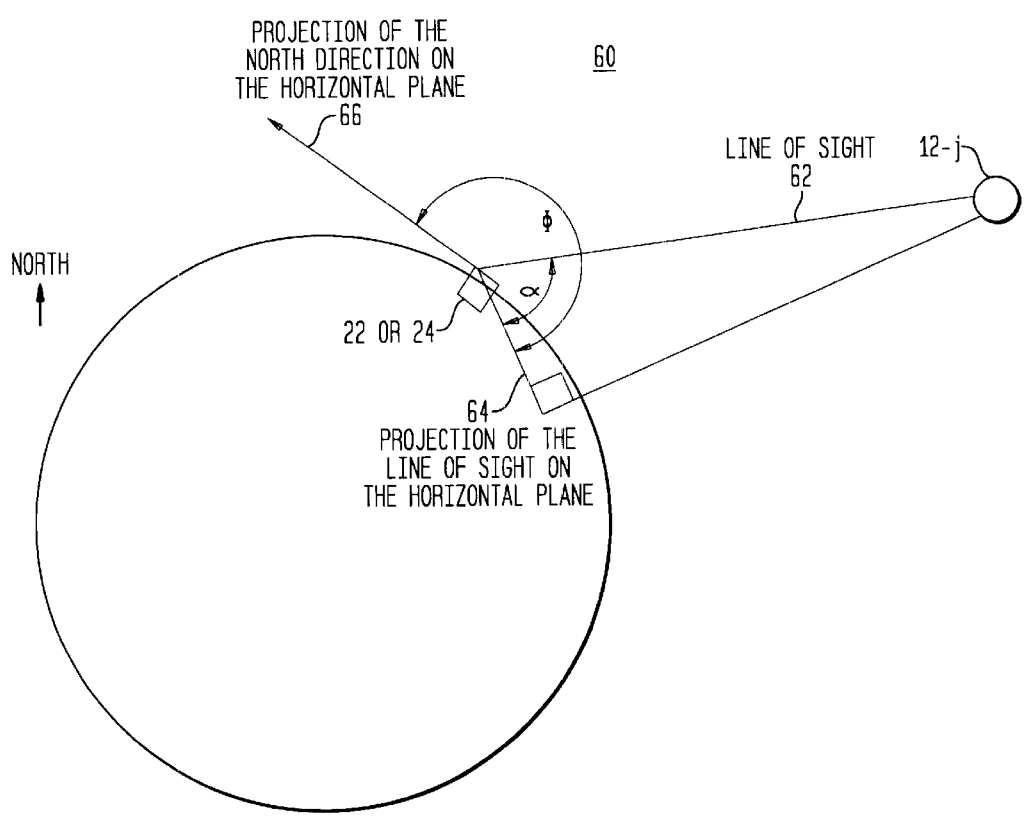
FIG. 5 illustrates an elevation angle and an azimuth angle corresponding to a satellite and a wireless global positioning system client.

The present application involves associating together, both downlink information and reliable position information, to populate and calibrate a position location system. The system and method of the present application, involve receiving reliable position information (from GPS signals, position signals derived from enhanced based position techniques (EOTD), etc.), at a plurality of locations, by at least one wireless mobile communication device; determining downlink information from signals received by at least one wireless mobile communication device, at each of the plurality of locations; and associating location information, obtained from received global position signals, with downlink information determined at each of the plurality of locations, to thereby calibrate the position location system.

A system is first preferably established to determine when reliable position data, such as GPS data, are received. These data are then assumed to be "ground truth". Thereafter, downlink information (such as MAHO or TA) from wireless mobile communication devices receiving the reliable GPS data and needed for subsequent contour matching, are associated with the reliable GPS data to populate a position location database. Once the database of associated reliable GPS data and downlink information is established, it can then be used to assist in determining the location of wireless mobile communication devices whose positions are not known and/or cannot easily be determined.

A reader skilled in the art will recognize that a variety of different methods exist to establish "ground truth". For example, EOTD is a mobile-assisted positioning method used by Global System for Mobile (GSM) Communication networks to accurately fix the latitude and longitude of a mobile device. While GPS, because of its accuracy, is the preferred embodiment, the description herein does not preclude the use of other mobile-assisted positioning methods such as EOTD.

The position location system is preferably an integrated wireless-global positioning (WGP) system, which can determine the location of a wireless mobile communication device ("mobile") from associated satellite measurements and wireless network measurements. The accuracy of the location identified for legacy mobiles and mobiles with poor or no GPS reception depends on the quality of a contour matching database, which must be established and maintained. Database quality is important for the success of the WGP system. In this method, the WGP system is used to automatically build and maintain the required database based upon reliable GPS data. The method does not require that a particular system be set up for the calibration, and it does not require a team of technical experts to perform field calibrations. With this method, the wireless mobile communication devices that have unobstructed reception of GPS signals are assumed to provide "ground truth" (reliable GPS data). Thereafter, network-derived downlink data (such as MAHO signal strength or TA timing information, etc.) can be taken at the same place, and can then be used to populate a contour matching database.

Furthermore, once the techniques introduced here are available, combinations of mobiles that use more than one communication scheme may be used to calibrate the databases for other mobiles. For example, a mobile with TDMA capability could make MAHO measurements. If that mobile were equipped with GSM-GPS capability, it could be used to calibrate the TDMA database. Accordingly, based upon received reliable GPS data, different types of mobiles can provide different types of calibration data for subsequent use in locating the position of other mobiles. The calibration approach outlined above has the advantage of allowing ordinary calls to be used for calibration, as the class of new mobiles with enhanced geolocation capability are used to automate the process of calibrating the network for future calls, both from newly equipped, and (perhaps more importantly) for legacy mobiles.

A satellite navigation system, such as the global positioning system, typically comprises a constellation of satellites that transmit satellite signals that can be used by a wireless mobile communication device ("wireless mobile") to determine the position of the wireless mobile. The position of a wireless mobile on earth is determined by the time differences required for global positioning system (GPS) signals initiated at the various satellites to be received by the wireless mobile. To determine a two dimensional position (latitude and longitude) usually entails receiving signals from at least three satellites. To determine a three dimensional position (latitude, longitude, and altitude) usually entails receiving signals from four or more satellites. This precondition, however, may not always be satisfied, especially when the satellite signals are obstructed and cannot be received directly by a wireless terminal such as when the wireless terminal is in a building.

The position of a wireless mobile may also be determined by the use of contour matching or similar techniques that use readily available information from a wireless network. Contour matching compares a signature (for example, from MAHO data in a TDMA system, Timing Advance (TA) in a GSM system, or generically any "downlink" information, etc.) with a database containing geographic locations and signatures. Populating and maintaining the database is achieved using information from mobiles receiving reliable GPS data as will be explained hereafter.

Figure 6:
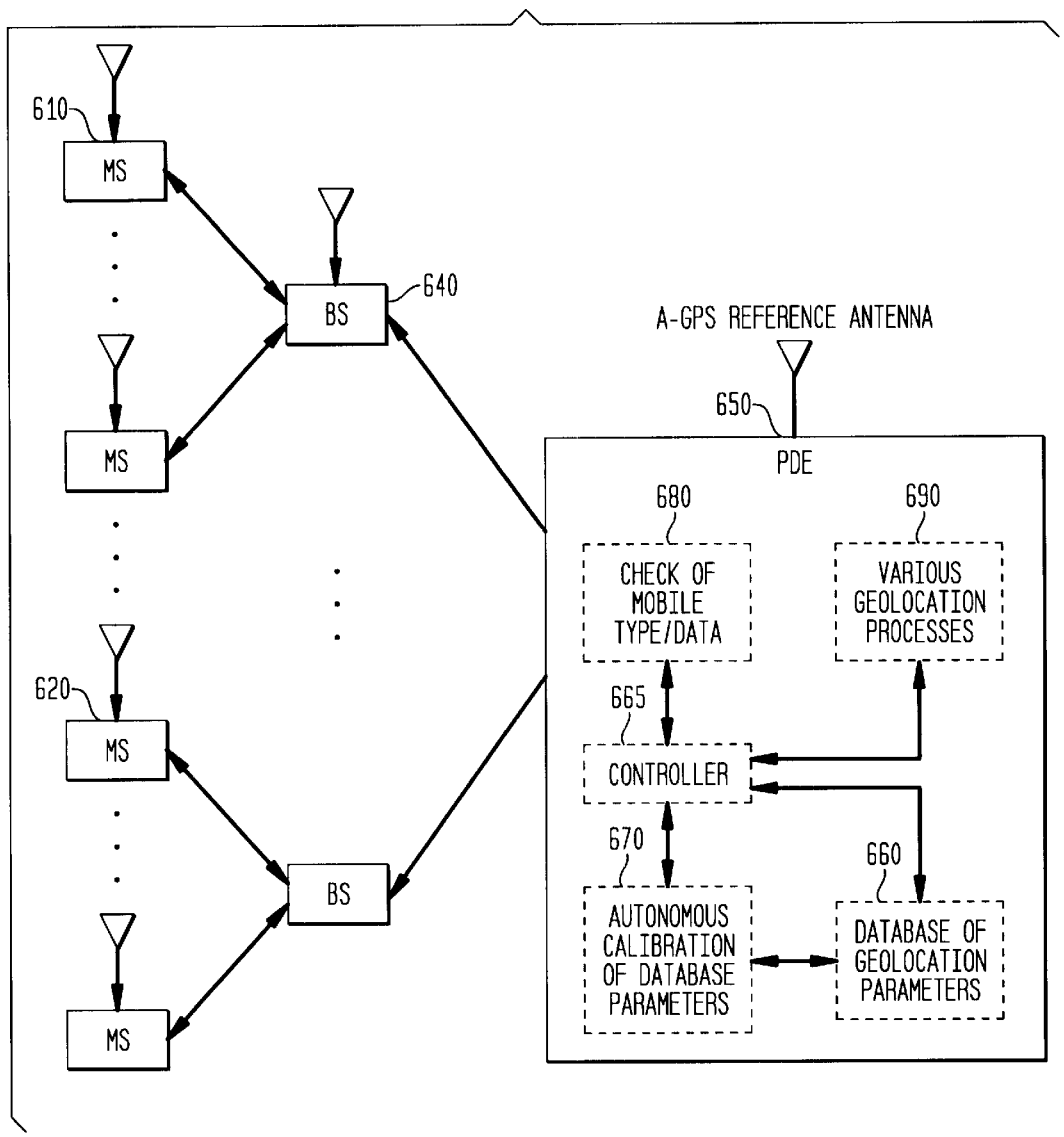
FIG. 6 is a block diagram showing the relationship of a database of geolocation parameters in an integrated wireless global positioning system in accordance with the principles of the invention.

FIG. 6 illustrates a plurality of wireless mobile communication devices, also called Mobile Stations (MS). These devices send information to, and receive information from a plurality of base stations (BS). For a commercial wireless network, there can be thousands of wireless mobile communication devices (MS) 610, 620, etc. distributed throughout an entire network that is served by dozens of base stations (BS) 640, etc. However, not all of the wireless mobile communication devices are equipped to receive signals from GPS satellites, and of those with GPS satellite signal reception capability, not all are positioned to receive unobstructed signals from GPS satellites.

Some of the wireless mobile communication devices have excellent reception of global positioning system (GPS) signals and wireless network signals, while others may be located where the GPS signals are partially or completely blocked by obstructions. For those wireless mobile communication devices that have excellent GPS reception, there may be no need to use the other parameters of the wireless network for position computation. The accuracy obtained by using the GPS signals received directly from the satellites is usually better than 10 meters for each position fix. However, the downlink information (MAHO/ TA/ etc.) obtained by these wireless mobile communication devices that have excellent GPS reception can be used in autonomous calibration of database parameters 670, through Position Determining Entity (PDE) processor 650, of a database of geolocation parameters 660 as shown in FIG. 6.

More preferably, as shown in FIG. 6, the method recognizes that many mobiles, and many types of mobiles, are served by most practical wireless systems. As highly accurate mobile location technologies such as Assisted GPS (A-GPS) are deployed, some of the mobiles 610, 620, etc. may be mobiles equipped for this highly accurate method. When mobiles 610, 620, etc. are so equipped and are located outdoors with a clear view of the sky, they will receive GPS signals clearly and be located accurately. In schemes where A-GPS processes run in a network-based Position Determining Entity (PDE) 650, the location of A-GPS equipped mobiles can be examined periodically for mobiles being located that are reporting signals of high carrier-to-noise ratios from say, 6 or 7 satellites. Reliable GPS signals from so many satellites could be taken as good reason to consider the resulting latitude/longitude as reliable, "ground truth." It will be evident to those skilled in the art when to consider A-GPS results within a PDE 650 as ground truth, involving GPS signal indications and well-known integrity monitoring processes.

When PDE 650 runs the process of locating mobile 610, 620, etc., it can also record the downlink information (signal strength, timing, etc.); assuming that the criteria for declaring a given location process as having found ground truth has been met. In FIG. 6, Base Stations 640, etc. would normally serve to transfer the necessary signals between the PDE 650 and the mobiles 610, 620, etc., although the PDE 650 may alternately be located within the Base Stations 640.

Preferably, the PDE 650, which normally locates the mobiles, is the entity in which the processes for autonomous calibration of database parameters 670 are run. However, the autonomous calibration of database parameters 670 can occur in a separate entity, outside of PDE 650. As shown in FIG. 6, the PDE 650 preferably further includes a memory maintaining a database of geolocation parameters 660, that reflects downlink timing and/or signal strength data associated with grid points of latitude/longitude. These grid points can be associated with geographic cells (small cells for location, not to be confused with cells or cellular communications). Again, this database 660 can also be maintained in a separate memory entity, along with or separate from the autonomous calibration 670.

Once the database 660 is well-populated with latitude/longitude position information and associated downlink data (MAHO/TA/etc.), legacy mobiles (and other mobiles that do not have unobstructed reception of global positioning system signals) can subsequently be located using a controller 665 of PDE 650 performing a look-up process in the database 660 (involving grid point pattern matching or contour matching, for example). Such look-up and matching schemes are discussed in one or more of application U.S. application Ser. No. 09/294,997 filed Apr. 20, 1999, entitled "A Bayesian-Update Based Location Prediction Method for CDMA Systems" to Kirk Chang et. al; U.S. application Ser. No. 09/321,729 filed May. 28, 1999, entitled "Geolocation Estimation Method for CDMA Terminals based on Pilot Strength Measurements" to Kirk Chang et al; and U.S. application Ser. No. 09/359,648 filed Jul. 26, 1999, entitled "Likelihood-Based Geolocation Prediction Algorithms for CDMA Systems using Pilot Strength Measurements" to Kirk Chang et. al., each of which is incorporated herein by reference, in its entirety and for all purposes.

Preferably, the look-up process is enhanced by forming contours (contour matching) of consistent parameters, instead of grid points. The process for locating mobiles via such controller/database processes is the subject of one or more of the U.S. applications mentioned above, and will not be further described for the sake of brevity, except to note that it may involve a process of initially populating the database 660, checking the quality of the resulting data, and updating the data periodically or as needed/indicated by the quality checks. Issues of granularity of the database, speed of look-ups, and even how many parameters to associate with a given grid point (i.e., how many parameters constitute an optimal signature, for example 5 timing and 4 strength measurements) are discussed in the aforementioned U.S. patent applications and will not be further discussed for the sake of brevity.

Additionally, the lookup process is enhanced by mechanisms which allow a network operator to selectively flush data from selected gridpoints, as would be necessary in the event of a change in network operating parameters in basestations with signals visible from the selected area, or in the event a new basestation is brought online. To avoid manual intervention, database update techniques may be employed which give greater weight to the most recent position estimates.

Accordingly, when geolocation processes need to be run on a mobile, the controller 665 within the PDE 650 can check the mobile type 680 or simply examine the data arriving to see whether a process of A-GPS or of contour matching should be pursued. The PDE 650 can advantageously host several geolocation processes 690, reflecting various technologies such as A-GPS, contour matching, and/or others, in a common solution engine. If reliable GPS data is received by the wireless mobile communication device and A-GPS can be used, a position of the mobile is determined based on this data. However, if the mobile has no capability to receive GPS/A-GPS signals or such signals are blocked or otherwise cannot be received, the contour matching process is pursued based upon stored downlink information and that received by the mobile. As such, any mobile can be easily located. The appropriate parts of the solution engine are engaged according to data type, and as described above, synergies between technologies, as illustrated above with A-GPS and contour matching, are exploited.

Figure 7:
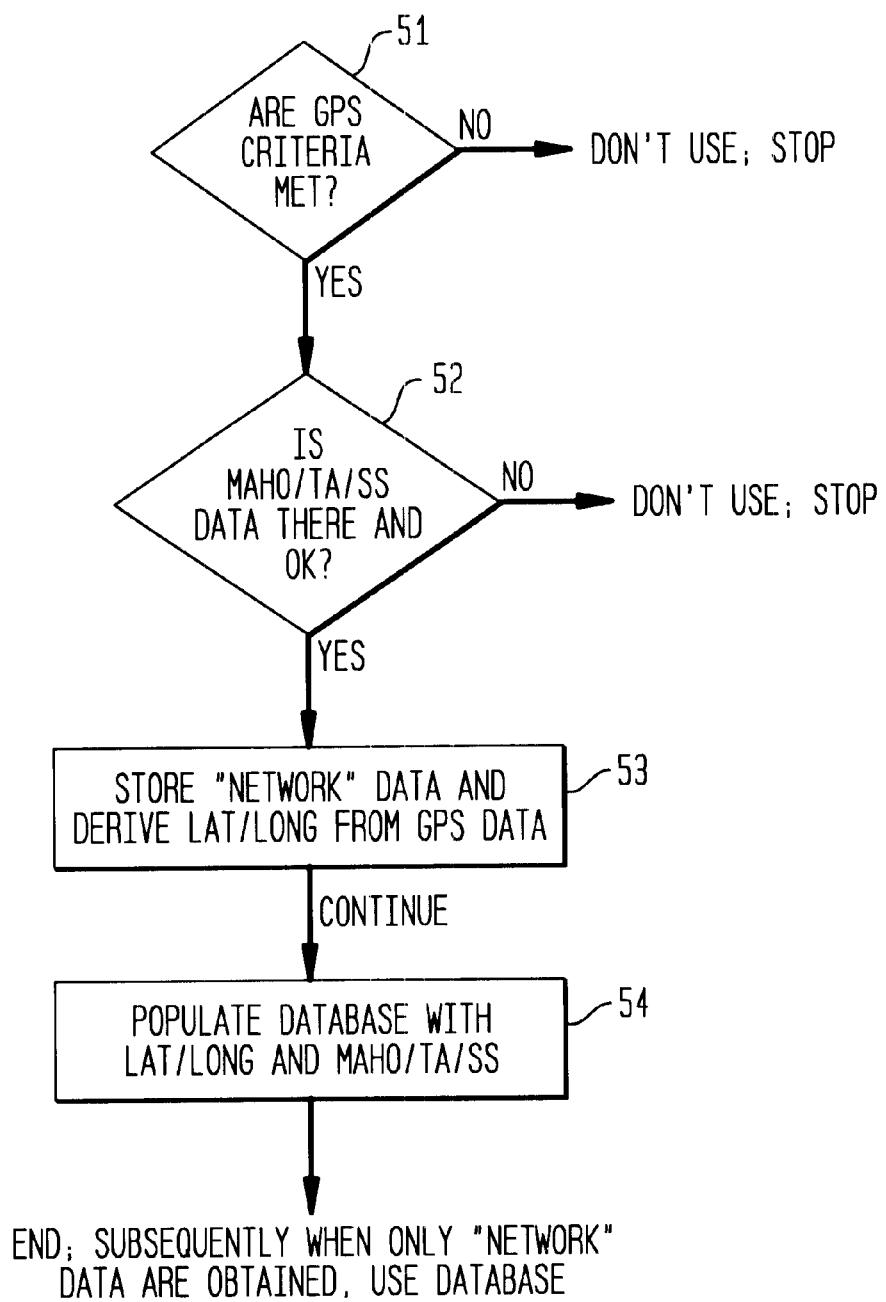
FIG. 7 is a flow diagram showing high-level logic for an integrated wireless global positioning system.

FIG. 7 is a flowchart illustrating the method for populating a position location system database, or for calibrating the position location system, using signal strength information of wireless mobile communication devices receiving reliable GPS/A-GPS signals. In step S1, it is first determined whether or not global positioning signals received by a wireless mobile communication device are reliable, based upon signal characteristics of the received global positioning signals (whether or not certain GPS/A-GPS criteria are met); i.e. the suitability of A-GPS data for being declared ground truth is tested. For example, the signal characteristics can include carrier to noise ratios, RMS measurement errors, etc. If it is determined that the received GPS/A-GPS signals are not reliable and/or that the specified GPS/A-GPS criteria has not been met, then these signals will not be used. Only signals from wireless mobile communication devices receiving reliable GPS/A-GPS signals are used for populating the database.

Thereafter, once the designated GPS/A-GPS criteria are met and it is determined that reliable GPS data has been received, then this data is designated as reliable position data, i.e. to be "ground truth". Then, in step S2, the downlink timing and/or signal strength measurements are checked to see whether or not enough data are present. The reliability of those data available are also measured, i.e., whether or not the wireless mobile communication device has enough accurate signal strength/timing data corresponding to that GPS confirmed position. If for some reason the wireless mobile communication device did not have such signal strength information at the confirmed GPS position, then the process would again stop. However, assuming that enough accurate data was present, then the method would proceed to step S3.

In step S3, the corresponding downlink or "network" data is then stored in association with the GPS/A-GPS position data. More preferably, positional latitude and longitude information is derived from the GPS/A-GPS data, and the corresponding downlink data is stored in association therewith.

In step S4, the database of the position location system is populated with the downlink information (such as the signal strength/timing, etc.) and associated latitude and longitude information. Accordingly, the derived latitude/longitude data, along with downlink timing and/or signal strength data can be considered an acceptable signature of a grid area, and will be stored in database 660; otherwise, those data are discarded.

Thereafter, with the database populated at various latitudes and longitudes with downlink data from other wireless mobile communication devices receiving reliable GPS/A-GPS data, a database is established for a position location system, from which position information can be derived (via "contour matching" of signal strength data, for example) for wireless mobile communication devices that do not receive reliable GPS/A-GPS data (including "legacy" mobiles which have no capabilities to receive any GPS/A-GPS data and/or mobile which do not receive accurate GPS/A-GPS data). As such, the calibrated position location system is useable to determine a location of a wireless mobile communication device by correlating its received downlink information (including MAHO/TA/etc.) with stored downlink information (including MAHO/TA/etc.), and by determining a location associated with the stored downlink information. From this populated database 660, contour matching or GPS/A-GPS data can be used to locate the position of any type of mobile.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of calibrating a position location system, comprising:
   receiving position signals, at a plurality of locations, by at least one wireless mobile communication device;
   determining downlink information from signals received by at least one wireless mobile communication device, at each of the plurality of locations; and
   associating location information, obtained from received position signals, with downlink information determined at each of the plurality of locations, to thereby calibrate the position location system.

2. The method of claim 1, wherein the received position signals are global positioning signals.

3. The method of claim 1, wherein the received position signals are signals derived from network originated signals.

4. The method of claim 3, wherein the received position signals are derived from an enhanced observed time difference (EOTD) technique.

5. The method of claim 2 further comprising:
determining whether or not the received global positioning signals are reliable based upon signal characteristics of the received global positioning signals, wherein only reliable global positioning signals are associated in the database.

6. The method of claim 3 further comprising:
determining whether or not the received position signals are reliable, wherein only reliable position signals are associated in the database.

7. The method of claim 4 further comprising:
determining whether or not the received position signals are reliable, wherein only reliable position signals are associated in the database.

8. The method of claim 5, wherein the signal characteristics include carrier to noise ratios and RMS measurement errors.

9. The method of claim 1, wherein the determined downlink information includes signal strength information.

10. The method of claim 1, wherein the determined downlink information includes mobile assisted hand-off (MAHO) information.

11. The method of claim 1, wherein the determined downlink information includes timing information.

12. The method of claim 1, wherein the determined downlink information includes timing advance (TA) information.

13. The method of claim 1, wherein the location information includes latitude and longitude information.

14. The method of claim 1, wherein the calibrated position location system is useable to determine a location of a wireless mobile communication device by correlating its received downlink information with stored downlink information, and by determining a location associated with the stored downlink information.

15. The method of claim 14, wherein correlating includes contour matching.

16. The method of claim 9, wherein the calibrated position location system is useable to determine a location of a wireless mobile communication device by correlating its received signal strength information with stored signal strength information, and by determining a location associated with the stored signal strength information.

17. The method of claim 16, wherein correlating includes contour matching.

18. The method of claim 10, wherein the calibrated position location system is useable to determine a location of a wireless mobile communication device by correlating its received timing information with stored timing information, and by determining a location associated with the stored timing information.

19. The method of claim 18, wherein correlating includes contour matching.

20. The method of claim 11, wherein the calibrated position location system is useable to determine a location of a wireless mobile communication device by correlating its received MAHO information with stored MAHO information, and by determining a location associated with the stored MAHO information.

21. The method of claim 20, wherein correlating includes contour matching.

22. The method of claim 12, wherein the calibrated position location system is useable to determine a location of a wireless mobile communication device by correlating its received TA information with stored TA information, and by determining a location associated with the stored TA information.

23. The method of claim 22, wherein correlating includes contour matching.

24. A system, comprising:
a database, populated with location information of a plurality of locations, obtained from position signals received by at least one wireless mobile communication device, and associated downlink information, obtained from signals received by at least one wireless communication device at each of a plurality of locations; and
controller, adapted to correlate received downlink information of a wireless mobile communication device with downlink information of the database, and adapted to determine a location of the wireless mobile communication device based upon location information associated with the correlated downlink information of the database.

25. The system of claim 24, wherein correlating includes contour matching.

26. The system of claim 24, wherein the received position signals are global positioning signals.

27. The system of claim 24, wherein the received position signals are signals derived from network originated signals.

28. The system of claim 27, wherein the received position signals are derived from an enhanced observed time difference (EOTD) technique.

29. The system of claim 26, wherein only reliable global positioning signals are associated in the database, reliability of the received global positioning signals being determined based upon signal characteristics of the received global positioning signals.

30. The system of claim 27, wherein only reliable position signals are associated in the database.

31. The system of claim 28, wherein only reliable position signals are associated in the database.

32. The system of claim 26, wherein the signal characteristics include carrier to noise ratios and RMS measurement errors.

33. The system of claim 24 wherein the determined downlink information includes signal strength information.

34. The system of claim 24, wherein the determined downlink information includes mobile assisted hand-off (MAHO) information.

35. The system of claim 24, wherein the determined downlink information includes timing information.

36. The system of claim 24, wherein the determined downlink information includes timing advance (TA) information.

37. The system of claim 24, wherein the location information includes latitude and longitude information.

38. The system of claim 34, wherein the controller is adapted to correlate received MAHO information of a wireless mobile communication device with MAHO information of the database, and is adapted to determine a location of the wireless mobile unit based upon location information associated with the correlated MAHO information of the database.

39. The system of claim 38, wherein correlating includes contour matching.

40. The system of claim 36, wherein the controller is adapted to correlate received TA information of a wireless mobile communication device with TA information of the database, and is adapted to determine a location of the wireless mobile unit based upon location information associated with the correlated TA information of the database.

41. The system of claim 40, wherein correlating includes contour matching.

42. A memory for use in a position location system, comprising:
- location information of a plurality of locations, obtained from position signals received by at least one wireless mobile communication device; and
- associated downlink information, obtained from signals received by at least one wireless communication device at each of a plurality of locations.

43. The memory of claim 42, wherein the received position signals are global positioning signals.

44. The memory of claim 42, wherein the received position signals are signals derived from network originated signals.

45. The memory of claim 44, wherein the received position signals are derived from an enhanced observed time difference (EOTD) technique.

46. The memory of claim 43, wherein only reliable global positioning signals are associated in the database, reliability of the received global positioning signals being determined based upon signal characteristics of the received global positioning signals.

47. The memory of claim 44, wherein only reliable position signals are associated in the database.

48. The memory of claim 45, wherein only reliable position signals are associated in the database.

49. The memory of claim 46, wherein the signal characteristics include carrier to noise ratios and RMS measurement errors.

50. The memory of claim 42, wherein the determined downlink information includes signal strength information.

51. The memory of claim 42, wherein the determined downlink information includes mobile assisted hand-off (MAHO) information.

52. The memory of claim 42, wherein the determined downlink information includes signal strength information.

53. The memory of claim 42, wherein the determined downlink information includes timing advance (TA) information.

54. The memory of claim 42, wherein the location information includes latitude and longitude information.

55. A method, comprising:
- determining whether or not a wireless mobile communication device has received reliable position signals;
- correlating downlink information of the wireless mobile communication device with downlink information of a database upon determining that the wireless mobile communication device has not received reliable position signals, the database including location information of a plurality of locations obtained from position signals received by at least one wireless mobile communication device and associated downlink information obtained from signals received by at least one wireless communication device at each of a plurality of locations; and
- determining a location of the wireless mobile communication device based upon location information associated with the correlated downlink information of the database, upon determining that the wireless mobile communication device has not received reliable position signals.

56. The method of claim 55, wherein the received position signals are global positioning signals.

57. The method of claim 55, wherein the received position signals are signals derived from network originated signals.

58. The method of claim 57, wherein the received position signals are derived from an enhanced observed time difference (EOTD) technique.

59. The method of claim 55, further comprising:
- determining a location of the wireless mobile communication device based upon the received reliable position signals, upon determining that the wireless mobile communication device has received reliable position signals.

60. The method of claim 56, further comprising:
- determining a location of the wireless mobile communication device based upon the received reliable global positioning signals, upon determining that the wireless mobile communication device has received reliable global positioning signals.

61. The method of claim 59, wherein the received position signals are signals derived from network originated signals.

62. The method of claim 61, wherein the received position signals are derived from an enhanced observed time difference (EOTD) technique.

63. The method of claim 55, wherein correlating includes contour matching.

64. The method of claim 55, wherein the downlink information includes signal strength information.

65. The method of claim 55, wherein the downlink information includes timing information.

66. The method of claim 64, wherein only reliable position signals are associated in the database, reliability of the received position signals being determined based upon signal characteristics of received global positioning signals.

67. The method of claim 66, wherein reliability of any global positioning signals received by the wireless mobile communication device is determined based upon signal characteristics of the received global positioning signals.

68. The method of claim 66, wherein the signal characteristics include carrier to noise ratios and RMS measurement errors.

69. The method of claim 67, wherein the signal characteristics include carrier to noise ratios and RMS measurement errors.

70. The method of claim 55, wherein the location information includes latitude and longitude information.

71. A method of determining location of a wireless mobile communication device, comprising:
- correlating received downlink information of a wireless mobile communication device with downlink information of a database, the database including location information of a plurality of locations obtained from global positioning signals received by at least one wireless mobile communication device and associated downlink information, obtained from signals received by at least one wireless communication device at each of a plurality of locations; and
- determining a location of the wireless mobile communication device based upon location information associated with the correlated downlink information of the database.

72. The method of claim 71, wherein only reliable global positioning signals are associated in the database, reliability of the received global positioning signals being determined based upon signal characteristics of the received global positioning signals.

73. The method of claim 72, wherein the signal characteristics include carrier to noise ratios and RMS measurement errors.

74. The method of claim 71, wherein the determined downlink information includes signal strength information.

75. The method of claim 71, wherein the determined downlink information includes mobile assisted hand-off (MAHO) information.

76. The method of claim 71, wherein the location information includes latitude and longitude information.

77. The method of claim 71, wherein the determined downlink information includes timing information.

78. The method of claim 71, wherein the determined downlink information includes timing advance (TA) information.

79. The method of claim 75, wherein the received MAHO information of a wireless mobile communication device is correlated with MAHO information of the database, and a location of the wireless mobile communication device is determined based upon location information associated with the correlated MAHO information of the database.

80. The method of claim 79, wherein the location information includes latitude and longitude information, and wherein the latitude and longitude of the wireless mobile communication device is determined based upon latitude and longitude information associated with the correlated MAHO information of the database.

81. The method of claim 78, wherein the received TA information of a wireless mobile communication device is correlated with TA information of the database, and a location of the wireless mobile communication device is determined based upon location information associated with the correlated TA information of the database.

82. The method of claim 81, wherein the location information includes latitude and longitude information, and wherein the latitude and longitude of the wireless mobile communication device is determined based upon latitude and longitude information associated with the correlated TA information of the database.

83. The method of claim 71, wherein the step of correlating includes contour matching.

84. The method of claim 79, wherein the step of correlating includes contour matching.

85. The method of claim 81, wherein the step of correlating includes contour matching.

* * * * *